United States Patent
Cho et al.

(10) Patent No.: US 10,366,154 B2
(45) Date of Patent: Jul. 30, 2019

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Minato-ku, Tokyo (JP)

(72) Inventors: Kenta Cho, Kawasaki Kanagawa (JP); Yasunari Miyabe, Kawasaki Kanagawa (JP); Kazuyuki Goto, Kawasaki Kanagawa (JP); Masahisa Shinozaki, Tokorozawa Saitama (JP); Keisuke Sakanushi, Mitaka Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/453,988

(22) Filed: Mar. 9, 2017

(65) Prior Publication Data
US 2017/0277672 A1 Sep. 28, 2017

(30) Foreign Application Priority Data
Mar. 24, 2016 (JP) ................. 2016-059546

(51) Int. Cl.
*G06F 17/24* (2006.01)
*G06F 3/0484* (2013.01)
(Continued)

(52) U.S. Cl.
CPC ........ *G06F 17/241* (2013.01); *G06F 3/04845* (2013.01); *G06F 17/2765* (2013.01);
(Continued)

(58) Field of Classification Search
CPC ................. G06F 17/241; G06F 17/218; G06F 17/30017; G06F 17/30796;
(Continued)

(56) References Cited

U.S. PATENT DOCUMENTS 5,572,728 A 11/1996 Tada et al.
5,794,249 A * 8/1998 Orsolini ............ G06F 17/30787
704/200

(Continued)

FOREIGN PATENT DOCUMENTS

JP 07-182365 7/1995
JP 3574606 7/2004
(Continued)

*Primary Examiner* — Wilson W Tsui
(74) *Attorney, Agent, or Firm* — Amin, Turocy & Watson LLP

(57) ABSTRACT

An information processing device according to an embodiment includes a keyword extracting unit, a tag generating unit and a UI control unit. The keyword extracting unit extracts a keyword from time-series texts within a time range set by a user. The tag generating unit generates a tag corresponding to a time period from a first appearing time until a last appearing time of a same keyword appearing plural times within a duration set according to the time range. The UI control unit creates a UI screen including a first display area in which a time axis corresponding to the time range is displayed and a second display area in which the tag is displayed while causing the tag to correspond to the time period on the time axis, and resets, by selecting the tag, a time period of the selected tag in the time range to update the UI screen.

11 Claims, 18 Drawing Sheets

T3

| TIME-SERIES TEXT ID | TIME-SERIES TEXT | TIME | USER ID | VOICE ID |
|---|---|---|---|---|
| ⋮ | ⋮ | ⋮ | ⋮ | ⋮ |
| 312 | BEFORE STARTING THIS MEETING, AS FOR THE TRANSFER TO THE SYSTEM DEPARTMENT | 13:00:15 | 3 | 15 |
| 313 | LET ME INTRODUCE THE PEOPLE TRANSFERRED TO OUR DEPARTMENT | 13:00:19 | 3 | 15 |
| 314 | MR. YAMASHITA FROM THE DEVELOPMENT DEPARTMENT | 13:00:25 | 3 | 15 |
| 315 | ALSO MR. TAUE JOINS US | 13:00:29 | 3 | 15 |
| 316 | I'M YAMASHITA. NICE TO SEE YOU. | 13:00:35 | 15 | 16 |
| ⋮ | ⋮ | ⋮ | ⋮ | ⋮ |

(51) Int. Cl.
*G06F 17/27* (2006.01)
*G06F 17/28* (2006.01)
*G10L 15/26* (2006.01)

(52) U.S. Cl.
CPC .......... *G06F 17/289* (2013.01); *G10L 15/265* (2013.01); *G10L 15/26* (2013.01)

(58) Field of Classification Search
CPC ..... G06F 17/30858; G06F 2203/04803; G06F 3/048; G10L 15/05; G10L 15/08; G10L 15/26; G10L 21/06
See application file for complete search history.

(56) References Cited

U.S. PATENT DOCUMENTS

| | | | | |
|---|---|---|---|---|
| 7,610,546 | B1 * | 10/2009 | Nagao | G06F 17/218 715/203 |
| 9,837,077 | B2 * | 12/2017 | Merril | G10L 15/26 |
| 2004/0095376 | A1 * | 5/2004 | Graham | G06F 17/30017 715/716 |
| 2005/0114131 | A1 * | 5/2005 | Stoimenov | G10L 15/26 704/251 |
| 2005/0154760 | A1 * | 7/2005 | Bhakta | G06F 17/2229 |
| 2006/0100877 | A1 * | 5/2006 | Zhang | G06Q 10/10 704/260 |
| 2006/0271869 | A1 * | 11/2006 | Thanu | G06F 9/4443 715/764 |
| 2007/0124298 | A1 * | 5/2007 | Agrawal | G06F 17/30991 |
| 2007/0192313 | A1 * | 8/2007 | Finley | G06F 17/30867 |
| 2008/0065618 | A1 * | 3/2008 | Maluf | G06F 17/30622 |
| 2008/0077869 | A1 | 3/2008 | Cho et al. | |
| 2011/0112835 | A1 | 5/2011 | Shinnishi et al. | |
| 2011/0170777 | A1 * | 7/2011 | Inagaki | G06F 17/30705 382/177 |
| 2012/0179465 | A1 * | 7/2012 | Cox | H04L 12/1822 704/235 |
| 2013/0308922 | A1 * | 11/2013 | Sano | H04N 21/4316 386/245 |
| 2014/0101527 | A1 * | 4/2014 | Suciu | G06F 17/218 715/230 |
| 2016/0247520 | A1 * | 8/2016 | Kikugawa | G10L 21/10 |
| 2017/0014090 | A1 | 1/2017 | Tsugo | |
| 2017/0092277 | A1 * | 3/2017 | Sandison | G06F 17/30026 |

FOREIGN PATENT DOCUMENTS

| | | |
|---|---|---|
| JP | 2008-077495 | 4/2008 |
| JP | 2008-262301 | 10/2008 |
| JP | 2012173774 | 9/2012 |
| JP | 5257330 | 5/2013 |
| JP | 2015-197736 | 11/2015 |

* cited by examiner

| USER ID | USER NAME |
|---|---|
| ⋮ | ⋮ |
| 3 | MIYAMOTO |
| 4 | KASHIMA |
| ⋮ | ⋮ |
| 15 | YAMASHITA |
| ⋮ | ⋮ |

| VOICE ID | VOICE DATA | TIME |
|---|---|---|
| ⋮ | ⋮ | ⋮ |
| 15 | [VOICE BYTE DATA] | 12:59:22 |
| 16 | [VOICE BYTE DATA] | 13:00:05 |
| ⋮ | ⋮ | ⋮ |

| TIME-SERIES TEXT ID | TIME-SERIES TEXT | TIME | USER ID | VOICE ID |
|---|---|---|---|---|
| ⋮ | ⋮ | ⋮ | ⋮ | ⋮ |
| 312 | BEFORE STARTING THIS MEETING, AS FOR THE TRANSFER TO THE SYSTEM DEPARTMENT | 13:00:15 | 3 | 15 |
| 313 | LET ME INTRODUCE THE PEOPLE TRANSFERRED TO OUR DEPARTMENT | 13:00:19 | 3 | 15 |
| 314 | MR. YAMASHITA FROM THE DEVELOPMENT DEPARTMENT | 13:00:25 | 3 | 15 |
| 315 | ALSO MR. TAUE JOINS US | 13:00:29 | 3 | 15 |
| 316 | I'M YAMASHITA. NICE TO SEE YOU. | 13:00:35 | 15 | 16 |
| ⋮ | ⋮ | ⋮ | ⋮ | ⋮ |

| KEYWORD TEXT ID | KEYWORD TEXT |
|---|---|
| ⋮ | ⋮ |
| 550 | TRANSFER |
| 551 | SYSTEM DEPARTMENT |
| 552 | BUILD TOOL |
| 553 | SCHEDULED MEETING |
| 554 | CODE RULE |
| 555 | PROCESS HEALTH CHECK |
| 556 | INTEGRATION TOOL |
| ⋮ | ⋮ |

| KEYWORD ID | KEYWORD TEXT ID | TIME | WEIGHT | TIME-SERIES TEXT ID |
|---|---|---|---|---|
| ⋮ | ⋮ | ⋮ | ⋮ | ⋮ |
| 812 | 550 | 13:00:15 | 2 | 312 |
| 813 | 550 | 13:00:19 | 3 | 313 |
| 814 | 550 | 13:01:35 | 1 | 320 |
| 815 | 551 | 13:00:15 | 1 | 312 |
| 816 | 552 | 13:02:08 | 3 | 327 |
| ⋮ | ⋮ | ⋮ | ⋮ | ⋮ |

| TAG ID | KEYWORD TEXT ID | START TIME | END TIME | WEIGHT | REPRESENTATIVE TIME-SERIES TEXT |
|---|---|---|---|---|---|
| ⋮ | ⋮ | ⋮ | ⋮ | ⋮ | ⋮ |
| 634 | 550 | 13:00:15 | 13:01:35 | 6 | 313 |
| 635 | 552 | 13:02:08 | 13:22:14 | 15 | 356 |
| 636 | 552 | 13:45:10 | 13:49:22 | 7 | 412 |
| 637 | 554 | 13:27:54 | 13:29:15 | 5 | 380 |
| ⋮ | ⋮ | ⋮ | ⋮ | ⋮ | ⋮ |

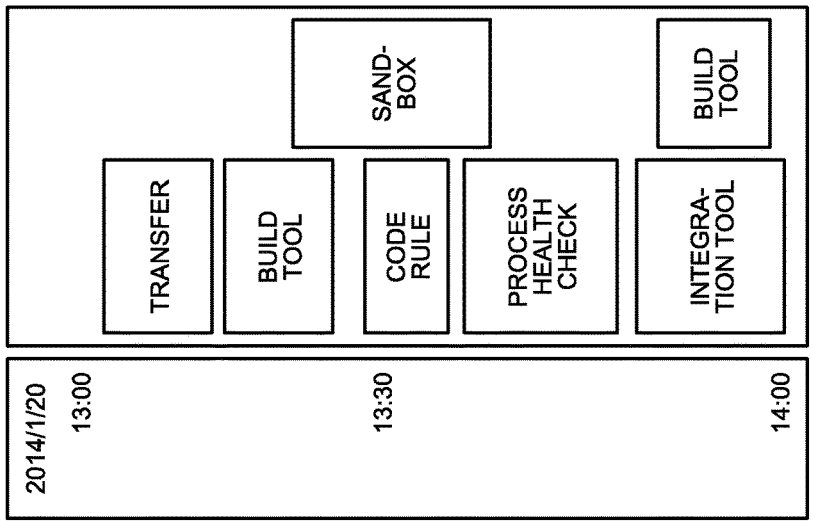
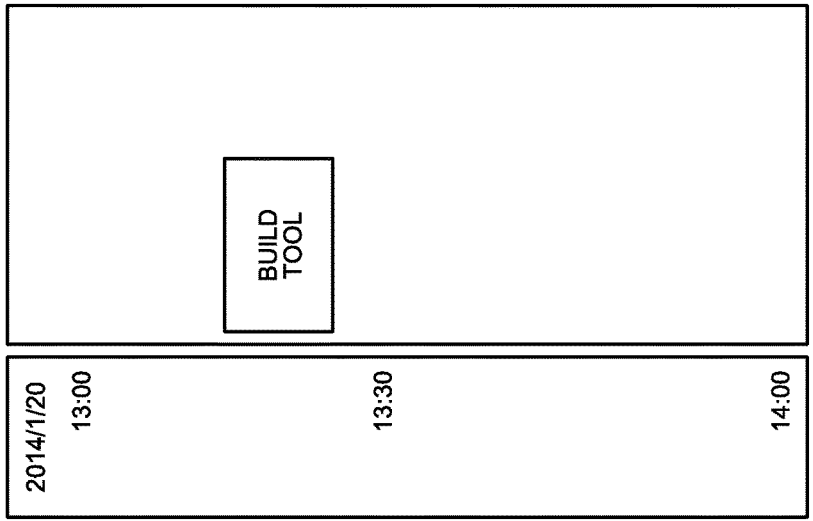
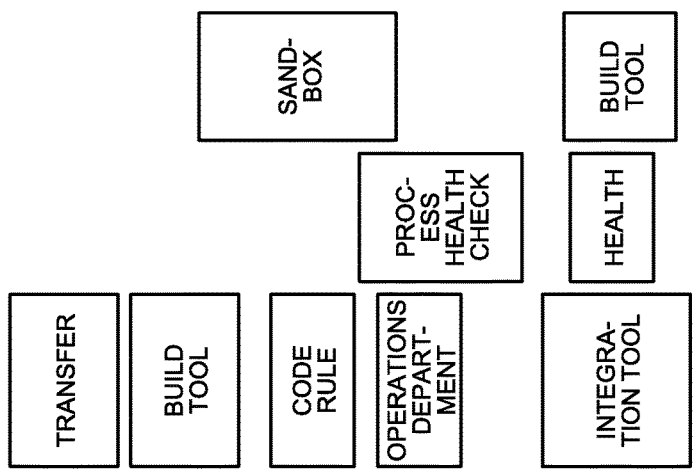

FIG.17

AGENDA
●MEETING TITLE
-FIFTH SYSTEM DEVELOPMENT
REVIEW MEETING
●DATE AND TIME
-2014/1/20 13:00
●LOCATION
-THIRD MEETING ROOM
●SUBJECTS
1. BUILD TOOL COMPARISON
2. CODE RULE REVIEW
3. PROCESS HEALTH CHECK
STANDARD

FIG.19

```
CHECK INSTRUCTION
● DATE AND TIME
-2015/5/12 14:00
●WORK AREA
-FIRST BUILDING LIVING ROOM
-THIRD BUILDING CORRIDOR
-FOURTH BUILDING ROOFTOP
●CHECK ITEM
-STAINS ON WALLS,
-PAINT DETERIORATION,
-WHETHER THERE IS RUST ON
DOORS AND HANDRAILS,
-STATE OF LIGHTING OF LAMPS,
-STATE OF WATER SUPPLY AND
DRAINAGE
```

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2016-059546, filed on Mar. 24, 2016; the entire contents of which are incorporated herein by reference.

FIELD

Embodiments described herein relate generally to an information processing device, an information processing method, and a computer program product.

BACKGROUND

In order to efficiently access necessary parts among various contents such as lengthy video or voice, there is a technology of attaching hierarchical tags on the contents to display a hierarchical structure of the tags. According to this technology, by tracing a hierarchical tag, a user can acknowledge the outline of the contents and can quickly find necessary parts.

In a case where a large amount of time-series texts such as meeting archives or records of call-takings at a call center are analyzed, in order to facilitate acknowledging of the topic of necessary parts and searching of parts corresponding to a specific topic, it is effective to display tags indicating the topics of time-series texts. However, in conventional technologies, because hierarchization of tags is fixed, it is not possible to display tags indicating the topics of time-series texts with an arbitrary scale specified by a user, and this problem requires improvements.

BRIEF DESCRIPTION OF THE DRAWINGS

FIG. 4 is a diagram illustrating an example of a time-series text table;

FIG. 5 is a diagram illustrating an example of a keyword text table;

FIG. 6 is a diagram illustrating an example of a keyword table;

FIG. 7 is a diagram illustrating an example of a tag table;

FIG. 9A is a schematic diagram for explaining an outline of a process of arranging tags;

FIG. 9B is a schematic diagram for explaining an outline of a process of arranging tags;

FIG. 9C is a schematic diagram for explaining an outline of a process of arranging tags;

FIG. 17 is a diagram illustrating a specific example of an agenda;

FIG. 19 is a diagram illustrating a specific example of check instructions;

DETAILED DESCRIPTION

Figure 1:
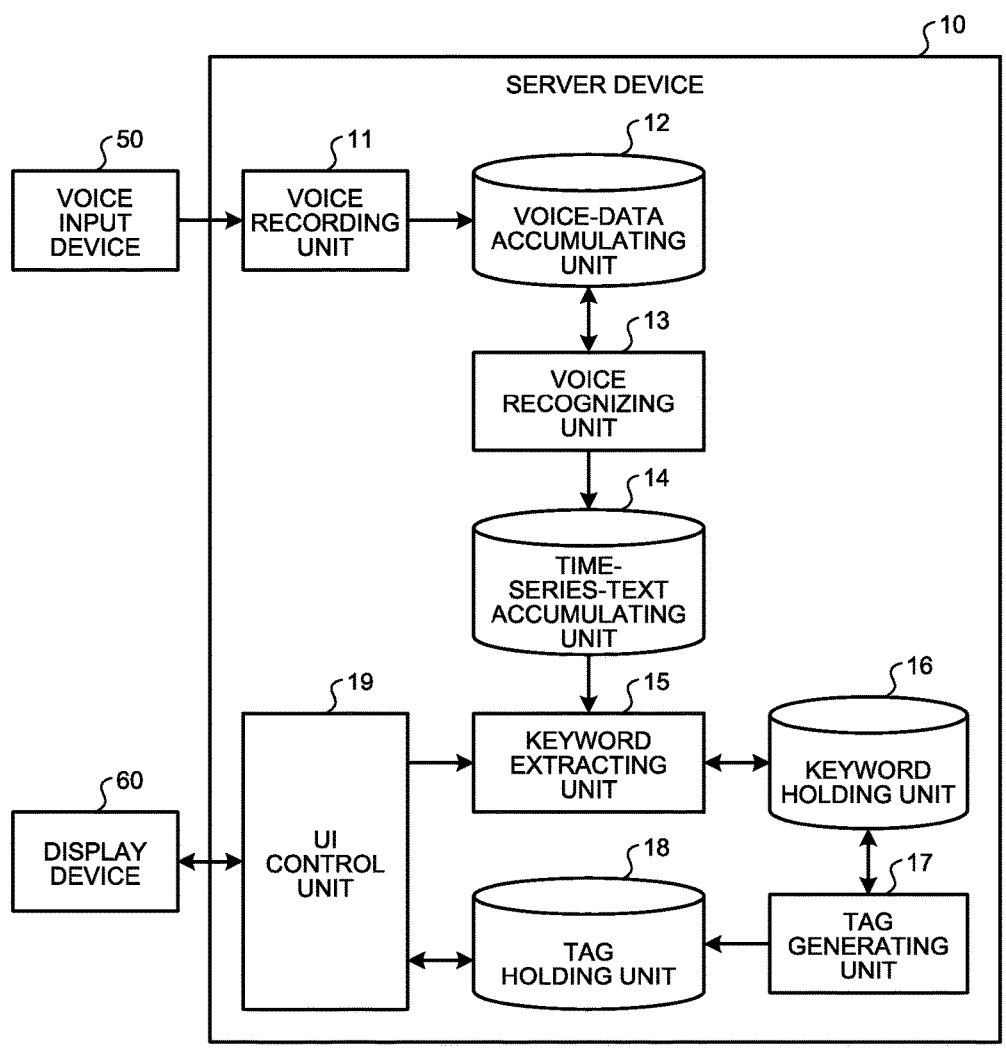
FIG. 1 is a block diagram illustrating a functional configuration example of a server device according to an embodiment.

An information processing device according to an embodiment includes a keyword extracting unit, a tag generating unit and a UI control unit. The keyword extracting unit extracts a keyword from time-series texts within a time range that is set according to a user operation. The tag generating unit generates a tag corresponding to a time period from a first appearing time until a last appearing time of a same keyword appearing a plurality of times within a duration that is set according to a size of the time range and having the keyword as a label. The UI control unit creates a UI screen including a first display area in which a time axis corresponding to the time range is displayed and a second display area in which the tag is displayed while causing the tag to correspond to the time period on the time axis, and resets, according to a user operation for selecting the tag on the UI screen, a time period of the selected tag in the time range to update the UI screen.

An information processing device according to an embodiment includes a keyword extracting unit, a tag generating unit, and a UI control unit. The keyword extracting unit extracts a keyword from time-series texts within a time range that is set according to a user operation. The tag generating unit generates a tag corresponding to a time period from a first appearing time until a last appearing time of a same keyword appearing a plurality of times within a duration that is set according to a size of the time range and having the keyword as a label. The UI control unit creates a UI screen including a first display area in which a time axis corresponding to the time range is displayed and a second display area in which the tag is displayed while causing the tag to correspond to the time period on the time axis, and, according to a user operation for selecting the tag on the UI screen, resets a time period of the selected tag in the time range to update the UI screen.

Outline of Embodiment

An information processing device, an information processing method, and a computer program product according to an embodiment will be described below in detail with reference to the accompanying drawings. In the present embodiment, there is assumed an application example of a system in which, for example, a recognition result text having recognized voices such as dialogues in a meeting is used as a time-series text and tags indicating the topics of the dialogues are displayed so as to support topic acknowledgement. The applicable examples of the present embodiment are not limited thereto. For example, as a time-series text, a text having recognized character images such as handwritten letters and printed letters using character recognition, or a text having recognized texts machine-translated into another language can be also used.

The information processing device according to the present embodiment can be realized, for example, as a server device of a server-client system using a network. As the system mode, a Web system is assumed. In this case, the server device has a function as a Web server, and causes a display device of a client terminal such as a PC (personal computer) or a smartphone having a Web browser incorporated therein to display a UI screen described later. The UI screen displayed on the display device of the client terminal is updated by the server device according to a user operation performed on the UI screen.

Configuration of Server Device

FIG. 1 is a block diagram illustrating a functional configuration example of a server device 10 according to the present embodiment. The server device 10 according to the present embodiment includes, for example, as illustrated in FIG. 1, a voice recording unit 11, a voice-data accumulating unit 12, a voice recognizing unit 13, a time-series-text accumulating unit 14, a keyword extracting unit 15, a keyword holding unit 16, a tag generating unit 17, a tag holding unit 18, and a UI control unit 19.

Further, the server device 10 according to the present embodiment is connected to a voice input device 50 and a display device 60 of a client terminal via a network. The voice input device 50 includes a microphone being incorporated in the client terminal or being externally connected to the client terminal, and a voice transmission unit that transmits voices recorded with the microphone to the server device 10. The display device 60 is a display device such as a liquid crystal display that displays a UI screen, which is created by the server device 10 and is rendered by a Web browser incorporated in the client terminal. It is not always necessary that the voice input device 50 and the display device 60 are included in the same client terminal.

A user can utilize services conducted by the server device 10 according to the present embodiment by logging in the system while using the client terminal. It is assumed that users who can log in the system are registered in advance. The registered users are managed with a user management table T1.

Figure 2:
FIG. 2 is a diagram illustrating an example of a user management table.

FIG. 2 is a diagram illustrating an example of the user management table T1. For example, as illustrated in FIG. 2, the user management table T1 stores therein a user ID uniquely allocated to each user and a user name of the user identified by the user ID, while the user ID and the user name are associated with each other. Other than a user name, items such as an account name and a password used for logging in can be stored in the user management table T1 as these items are associated with the user ID. Voices input in the server device 10 are shared in the system, and all users in the system can refer to the input voices. It is also possible that a group is set for a plurality of users such that specific voices are shared only by the users in a specific group.

The voice recording unit 11 stores, in the voice-data accumulating unit 12, voices input in the server device 10 by the voice input device 50. The voice-data accumulating unit 12 accumulates the voices input in the server device 10. The voices are stored in the voice-data accumulating unit 12 as, for example, byte data of linear PCM. The byte data can be created by using an arbitrary audio codec.

Figure 3:
FIG. 3 is a diagram illustrating an example of a voice table.

The voices accumulated in the voice-data accumulating unit 12 are managed with a voice table T2. FIG. 3 is a diagram illustrating an example of the voice table T2. For example, as illustrated in FIG. 3, the voice table T2 stores therein a voice ID uniquely allocated to each voice, a voice (voice data) identified by the voice ID, and a time when inputting of the voice started, while the voice ID, the voice, and the time are associated with one another. In the example of FIG. 3, as for the time when inputting of the voice started, the date, month, and year thereof are omitted. Also in the following examples, in the notation of the time, the date, month, and year thereof are omitted; however, in practice, times including the date, month, and year thereof are handled.

The voice recognizing unit 13 performs a voice recognizing process on the voices to be accumulated in the voice-data accumulating unit 12, and stores an obtained recognition result text as a time-series text in the time-series-text accumulating unit 14. The voice recognizing unit 13 can perform a voice recognizing process on the voices input in the server device 10 simultaneously with the voice recording unit 11 storing, in the voice-data accumulating unit 12, the voices input in the server device 10. Further, when candidates for a plurality of recognition result texts are obtained by the voice recognizing process, it is possible to store a time-series text including these candidates in the time-series-text accumulating unit 14. The time-series-text accumulating unit 14 accumulates therein the time-series text obtained by the voice recognizing process performed by the voice recognizing unit 13.

The time-series text accumulated in the time-series-text accumulating unit 14 is managed with a time-series text table T3. FIG. 4 is a diagram illustrating an example of the time-series text table T3. For example, as illustrated in FIG. 4, the time-series text table T3 stores therein a time-series text ID uniquely allocated to each time-series text, a time-series text identified by the time-series text ID, a time of the time-series text, a user ID of a user who has spoken a voice corresponding to the time-series text, and a voice ID of the voice, while these items are associated with one another.

The time of the time-series text is a time of a voice corresponding to the time-series text, that is, a time when inputting of a voice on which a voice recognizing process for obtaining the time-series text is performed. As described above, the time-series text can include candidates for a plurality of recognition result texts.

The keyword extracting unit 15 extracts a keyword from time-series texts within a time range that is set according to a user operation, among time-series texts accumulated in the time-series-text accumulating unit 14. As the user operation for setting the time range, it is possible to use an arbitrary method capable of performing range specification. For example, when a smartphone is used as a client terminal, the time range can be set with a pinch-in operation and a pinch-out operation on the smartphone, and when a PC is used as a client terminal, the time range can be set according to a mouse operation on the PC, and the time range can be set according to an operation for specifying a starting point and a terminal point of the time range with a pull-down list.

The keyword extracting unit 15 refers to the time-series text table T3, and, among the time-series texts accumulated in the time-series-text accumulating unit 14, clips out time-series texts having a time within a time range that is set as described above. Subsequently, the keyword extracting unit 15 extracts a keyword from the clipped time-series texts. The extraction of the keyword is performed with, for example, a method using a scale related to the appearing frequency of words such as TF-IDF, and a weight indicating the keyword and its importance is calculated. For example, the keyword extracting unit 15 performs a morphological analysis on the clipped time-series texts, calculates weights using TF-IDF and the like with respect to nouns and unknown words, sorts the words in descending order of weight, and the words within a given high rank are designated as keywords.

As an example, the weight of a keyword is calculated by multiplying a weight unique to the keyword calculated with TF-IDF by a frequency as to how many times the keyword appears in a time-series text, in a predetermined time range from a time when the keyword first appears. Therefore, the weight of the same keyword may vary according to its appearing time.

Post processing such as coupling a plurality of keywords that appear successively in order to create a new keyword can be performed. Further, it is possible to extract keywords by using another scale, such as that using a co-occurrence relation between words. In addition, when a time-series text includes candidates for a plurality of recognition result texts, keywords can be extracted from each of these candidates.

When the keyword extracting unit 15 extracts keywords from time-series texts within a set time range with the processes described above, the keyword extracting unit 15 creates a keyword text table 14 and a keyword table T5 for managing each of the extracted keywords, and stores these tables in the keyword holding unit 16. The keyword holding unit 16 temporarily (for example, until the setting of the time range is changed) holds the keyword text table T4 and the keyword table T5.

FIG. 5 is a diagram illustrating an example of the keyword text table 14 held in the keyword holding unit 16. For example, as illustrated in FIG. 5, the keyword text table 14 stores therein a keyword text ID uniquely allocated to each keyword text (a text corresponding to the notation of a keyword) and a keyword text identified by the keyword text ID, while the keyword text ID and the keyword text are associated with each other.

FIG. 6 is a diagram illustrating an example of the keyword table T5 held in the keyword holding unit 16. For example, as illustrated in FIG. 6, the keyword table T5 stores therein a keyword ID uniquely allocated to each keyword extracted by the keyword extracting unit 15, a keyword text ID corresponding to a keyword identified by the keyword ID, a time when the keyword has appeared, a weight calculated with respect to the keyword, and a time-series text ID of the time-series text in which the keyword has appeared, while these items are associated with one another.

In the present embodiment, as the time when a keyword has appeared, while the time of the time-series text in which the keyword is included (an input start time of a voice corresponding to the time-series text) is used, the time is not limited thereto. For example, in a voice recognizing process, when the appearing time is recorded in the unit of word, the appearing time recorded in the unit of word can be used as the appearing time of the keyword.

The tag generating unit 17 refers to the keyword text table 14 and the keyword table T5 held in the keyword holding unit 16, and among the keywords extracted by the keyword extracting unit 15, a keyword group including the same keyword texts in a predetermined duration is specified. The duration is set according to the size of the time range that is set according to a user operation. The tag generating unit 17 generates a tag corresponding to a time period from the first appearing time until the last appearing time of the same keyword (keywords of the same keyword text) appearing within the duration for a plurality of times, and having the keyword (the keyword text) as a label. As the duration used as a reference for tag generation, for example, one tenth of the time range that is set according to a user operation is used. The relation between the size of the time range that is set according to a user operation and the duration that is used as a reference for tag generation is not limited to the above example, and it suffices that the relation is set arbitrarily according to the use application and the like.

By collecting keywords with the appearing times thereof being concentrated in the duration described above within a specified keyword group and forming the keywords as one group, the tag generating unit 17 generates a tag indicating a topic of a time-series text within the time range that is set according to a user operation. That is, because keywords which are spoken repeatedly within the set time range often indicate a certain topic within the time range, these keywords are tagged. When a tag is displayed on a UI screen described later, a keyword text that is arranged in the corresponding time period and functions as a label of the tag is displayed.

When the tag generating unit 17 generates, with the processes described above, a tag indicating a topic of a time-series text, the tag generating unit 17 creates a tag table T6 for managing the generated tag, and stores the tag table T6 in the tag holding unit 18. The tag holding unit 18 temporarily (for example, until the setting of the time range is changed) holds the tag table T6.

FIG. 7 is a diagram illustrating an example of the tag table T6 held in the tag holding unit 18. For example, as illustrated in FIG. 7, the tag table T6 stores therein a tag ID uniquely allocated to each tag generated by the tag generating unit 17, a keyword text ID of a keyword text corresponding to the tag identified by the tag ID, a start time and an end time indicating a time period of the tag, a weight calculated with respect to the tag, and a representative time-series text ID for identifying a representative time-series text of the tag, while these items are associated with one another.

The start time indicates the first appearing time of a keyword generated as a tag, and the end time indicates the last appearing time of the keyword generated as a tag. The time period between the start time and the end time is the time period of the tag. The weight of the tag is calculated based on the weights of respective keywords collected as one group. For example, as for the calculation, a combination of the weights of respective keywords can be used, and it is possible to perform correction such that the longer the display width of the tag, the higher its weight is. Further, the mean value of the weights of respective keywords can be used for the calculation. The representative time-series text is a representative time-series text among time-series texts from which a keyword corresponding to the tag is extracted, and the time-series text ID of the time-series text is the representative time-series text ID. As the representative time-series text, for example, a time-series text from which a keyword having the highest weight among the keywords collected as one group is used. It is also possible to perform correction such that, for example, a time-series text including the largest number of other keywords is preferentially designated as the representative time-series text.

Figure 8:
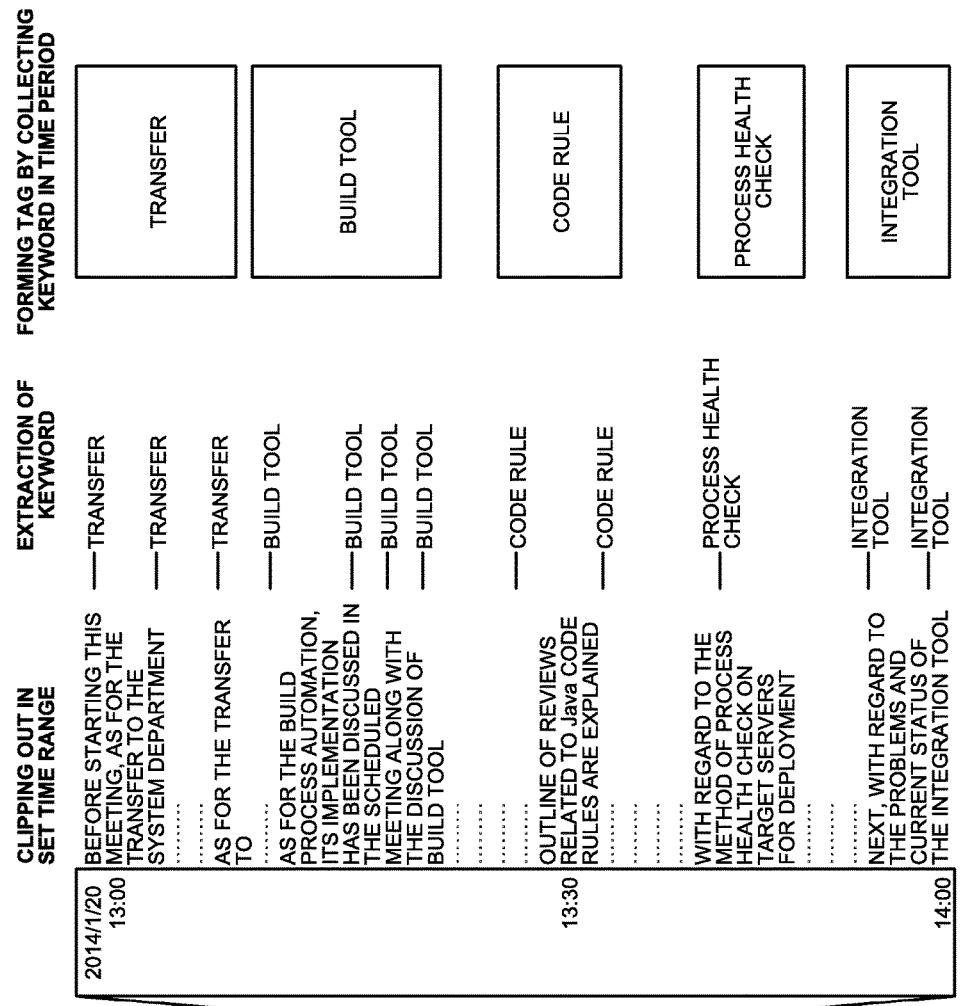
FIG. 8 is a schematic diagram for explaining an outline of processes for keyword extraction and tag generation.

FIG. 8 is a schematic diagram for explaining an outline of processes for keyword extraction and tag generation. First, the keyword extracting unit 15 performs clipping out on time-series data accumulated in the time-series-text accumulating unit 14 in a time range that is set according to a user operation. In the example of FIG. 8, 13:00 to 14:00 on 20 Jan. 2014 is set as the time range, and time-series texts within the time range are clipped out.

Next, the keyword extracting unit 15 performs extraction of a keyword on the clipped time-series texts. The keyword includes the text (keyword text), and a time and a weight of a time-series text in which the keyword is included. In the example of FIG. 8, the clipped time-series texts are recognition result texts in a meeting related to system development. The keyword extracting unit 15 performs a morphological analysis on these time-series texts, calculates weights with respect to nouns and unknown words to sort the words in descending order of weight, and designates the words within a given number of higher-ranking words as keywords. Subsequently, the keyword extracting unit 15 creates the keyword text table T4 exemplified in FIG. 5 and the keyword table T5 exemplified in FIG. 6, and stores these tables in the keyword holding unit 16.

Next, the tag generating unit 17 collects keywords having the same keyword text ID in the keyword table T5, the keywords of which the time (appearing time) thereof is within a duration that is set according to the size of the time range, as one group to form a tag. In the example of FIG. 8, the keywords "transfer" appearing at 13:00:15, 13:00:19, and 13:01:35 (see FIGS. 5 and 6) are collected as one tag. The "transfer" tag has a time period from 13:00:15 that is a time when, within the duration described above, the keyword "transfer" appeared first time to 13:01:35 that is a time when the keyword "transfer" appeared last time. In the example of FIG. 8, similarly to the "transfer" tag, a "build tool" tag, a "code rule" tag, a "process health check" tag, an "integration tool" tag, and the like are generated. Subsequently, the tag generating unit 17 creates the tag table T6 exemplified in FIG. 7, and stores the tag table T6 in the tag holding unit 18.

The UI control unit 19 creates a UI screen that is displayed on the display device 60 of a client terminal. The UI screen created by the UI control unit 19 is a screen on which tags generated by the tag generating unit 17 are arranged while the tags are corresponded to a time axis representing a time range that is set according to a user operation, and representative time-series texts corresponding to each of the tags are displayed simultaneously with the tags. The UI control unit 19 updates the UI screen according to user operations performed on the UI screen. Specifically, when an operation for selecting an arbitrary tag on the UI screen is performed, the UI control unit 19 resets the time period corresponding to the selected tag in the time range described above. Due to this operation, keyword extraction and tag generation based on the newly reset time range are performed. The UI control unit 19 recreates a UI screen using the newly generated tags, and updates the UI screen displayed on the display device 60.

FIG. 9A, FIG. 9B, and FIG. 9C are schematic diagrams for explaining an outline of a process of arranging tags. As illustrated in FIG. 9A, each of the tags generated by the tag generating unit 17 has a time period according to an appearing time of a keyword. The UI control unit 19 sorts the tags generated by the tag generating unit 17 in descending order of weight and puts the sorted tags on a list. Subsequently, the UI control unit 19 selects the tags from the list in descending order of weight, checks whether the selected tags can be arranged in their corresponding time periods, and if the arrangement can be made, arranges the tags in their corresponding time periods. Thereafter, the selected tags are deleted from the list. The UI control unit 19 performs this process until the list becomes empty. FIG. 9B illustrates a state where the "build tool" tag, which has the highest weight, is arranged, and FIG. 9C illustrates a result of an attempt of arranging all the tags illustrated in FIG. 9A.

The UI screen created by the UI control unit 19 has a plurality of columns in which tags can be arranged. In the examples of FIGS. 9B and 9C, there are spaces for two columns in which tags can be arranged, and two tags can be arranged in the same time period. The number of columns in which tags can be arranged is changed according to the horizontal width of a browser for rendering the UI screen. The tags are arranged in descending order of weight in a column in which time periods corresponding to the tags are unused. When there is no space for arranging the tags, the process of arranging the tags is skipped. The UI control unit 19 performs this process on all the generated tags.

After arranging the tags as described above, the UI control unit 19 arranges representative time-series texts corresponding to the respective tags. Similarly to the tags, an attempt is made for the representative time-series texts to be arranged for each of the tags that are sorted in order of weight. While the location where the respective representative time-series texts are arranged is set to match the time period of the tags as much as possible, some coordinate deviation is permitted.

According to the above processes, the UI control unit 19 creates a UI screen on which a time axis corresponding to a time range that is set according to a user operation, tags generated by the tag generating unit 17, and representative time-series texts of the tags are displayed. The UI screen created by the UI control unit 19 is displayed on the display device 60 of a client terminal.

Figure 10:
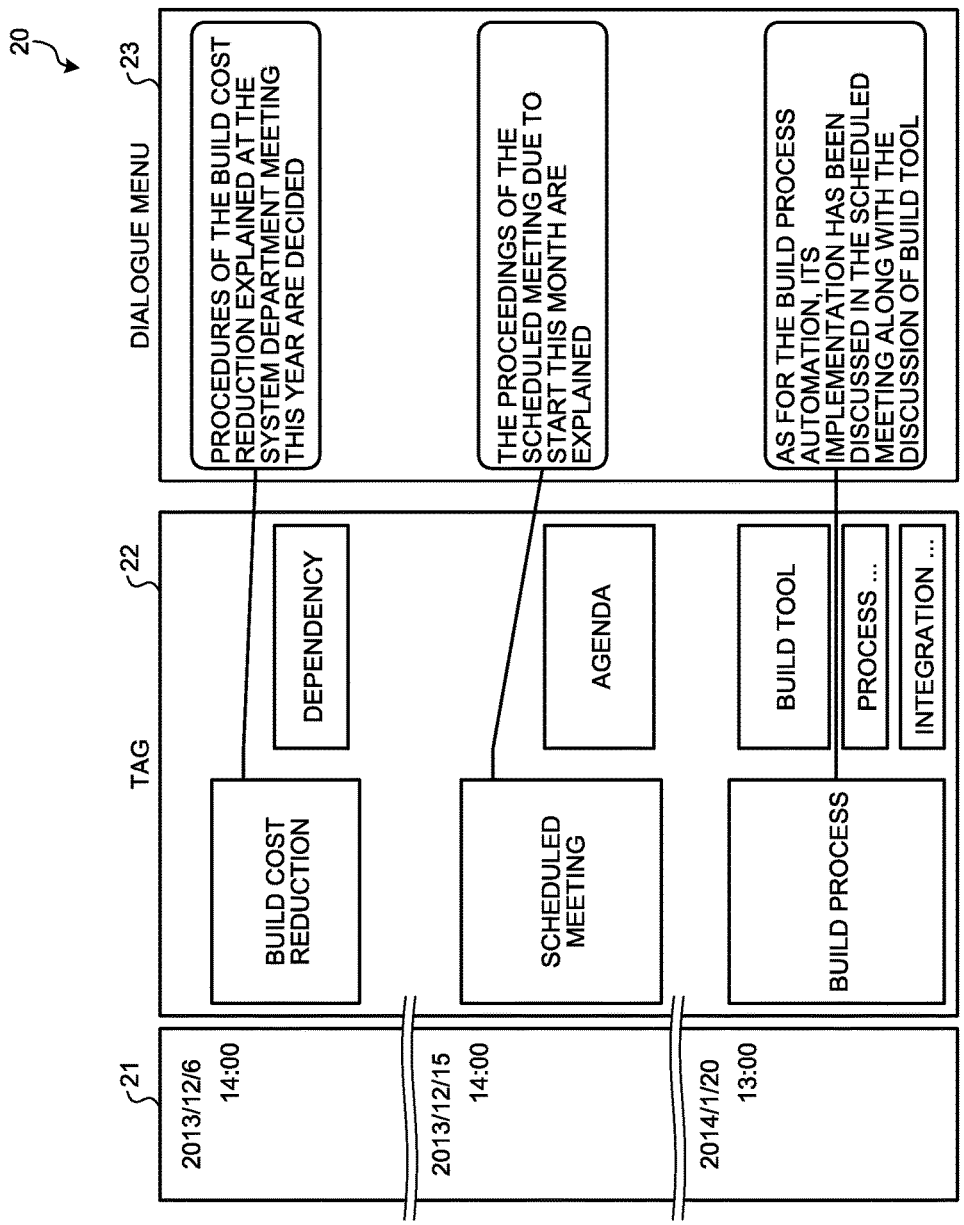
FIG. 10 is a diagram illustrating an example of a UI screen.

FIG. 10 is a diagram illustrating an example of a UI screen 20 that is created by the UI control unit 19 and displayed on the display device 60 of a client terminal. The UI screen 20 includes a time axis area 21 (first display area) that is on the left side of the screen where a time axis corresponding to a time range that is set according to a user operation is displayed, a tag area 22 (second display area) that is in the center of the screen where tags are displayed while causing these tags to correspond to the time periods on the time axis of the time axis area 21, and a dialogue menu area 23 (third display area) on the right side of the screen where representative time-series texts corresponding to the tags displayed in the tag area 22 are displayed.

In the example of FIG. 10, there is illustrated an example in which a time range of a month or more, which is from 6 Dec. 2013 to 20 Jan. 2014, is set according to a user operation, and a time axis corresponding to this time range is displayed in the time axis area 21. When many time periods having no time-series text are included in the time range that is set according to a user operation, as exemplified in FIG. 10, displaying of these time periods can be omitted.

In the tag area 22, among the tags generated by the tag generating unit 17 with respect to the time-series texts within the set time range, tags that can be arranged in descending order of weight are displayed. Further, in the dialogue menu area 23, among the representative time-series texts of the tags arranged in the tag area 22, representative time-series texts that can be arranged in descending order of weight of tags are displayed. It is preferable that the tags displayed in the tag area 22 and the representative time-series texts displayed in the dialogue menu area 23 are displayed such that corresponding relations between the tags and the representative time-series texts are clearly illustrated with a predetermined visual expression. In the example of FIG. 10, by the lines connecting each of the tags and each of the corresponding representative time-series texts, the corresponding relations between the tags and the representative time-series texts are clearly illustrated. The visual expression for clearly illustrating the corresponding relations between the tags and the representative time-series texts is not limited to this example. For example, other visual expressions such as displaying the background of a tag and that of a representative time-series text in a corresponding relation with the same color can be used.

Users can select tags displayed in the tag area 22 on the UI screen 20 described above. When a certain tag is selected according to a user operation, a time period corresponding to the selected tag is set in a new time range, keyword extraction and tag generation based on the new time range are performed, and the UI screen 20 is updated.

Figure 11:
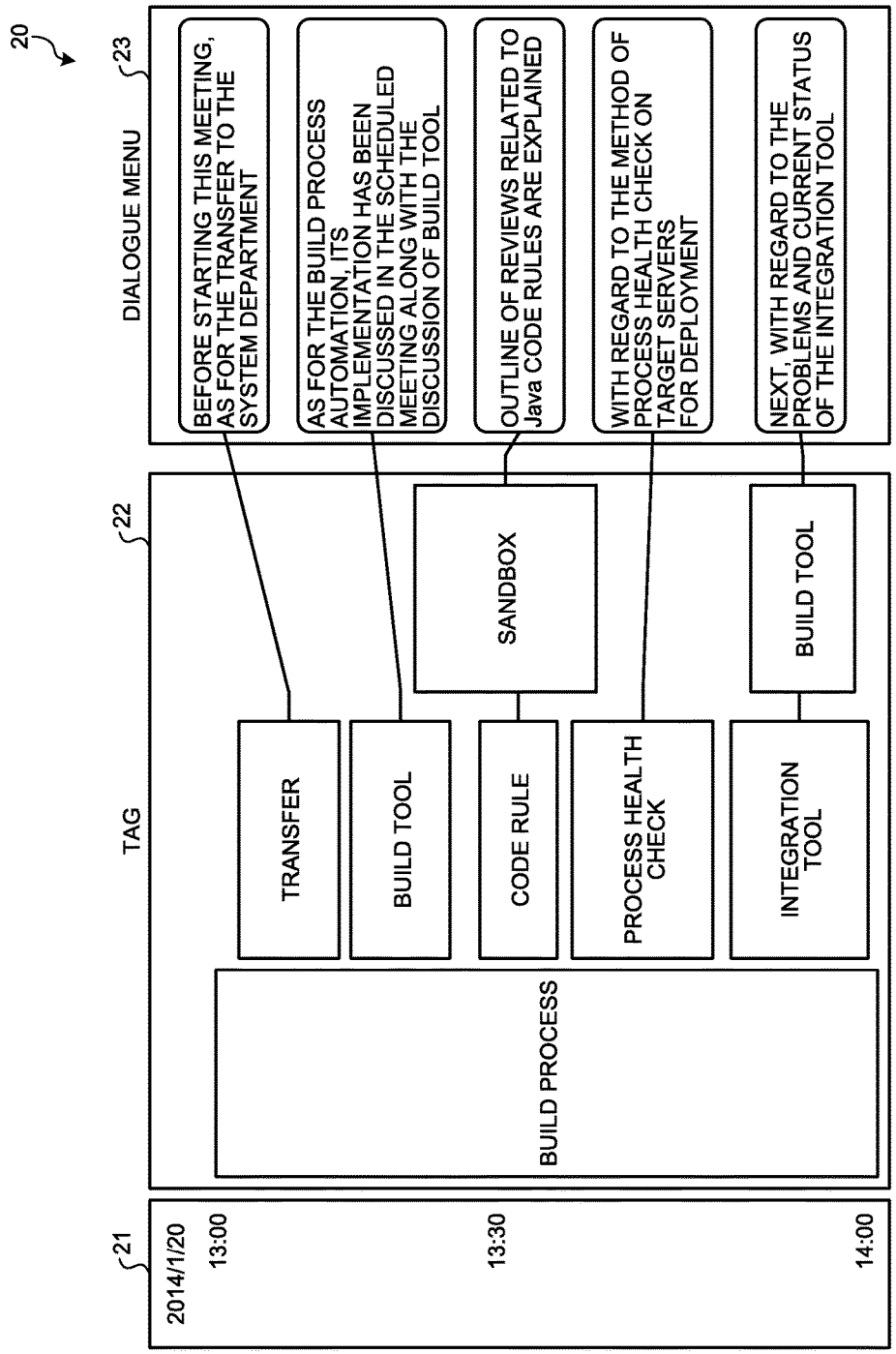
FIG. 11 is a diagram illustrating an example of the UI screen.

FIG. 11 is a diagram illustrating an example of the UI screen 20 that is updated according to a user operation, and illustrates a UI screen 20 updated according to selection of a "build process" tag on the UI screen 20 in FIG. 10. When the "build process" tag is selected by a user on the UI screen in FIG. 10, a time period from around 13:00 to 14:00 on 20 Jan. 2014, which is the time period of the "build process" tag, is set in a new time range. Subsequently, a time axis corresponding to this time range is displayed in the time axis area 21. Further, among the tags generated by the tag generating unit 17 with respect to the time-series texts within this time range, tags that can be arranged in descending order of weight are displayed in the tag area 22. Furthermore, among the representative time-series texts of the tags arranged in the tag area 22, representative time-series texts that can be arranged in descending order of weight of tags are displayed. When candidate texts are included in the representative time-series texts, it is possible to preferentially display texts in which a keyword "build process", which is a label of the tag selected by the user, is included.

As illustrated in FIG. 11, the "build process" tag selected by a user is displayed on the leftmost part in the tag area 22, and when the user selects this tag, the screen returns to the UI screen 20 illustrated in FIG. 10.

Figure 12:
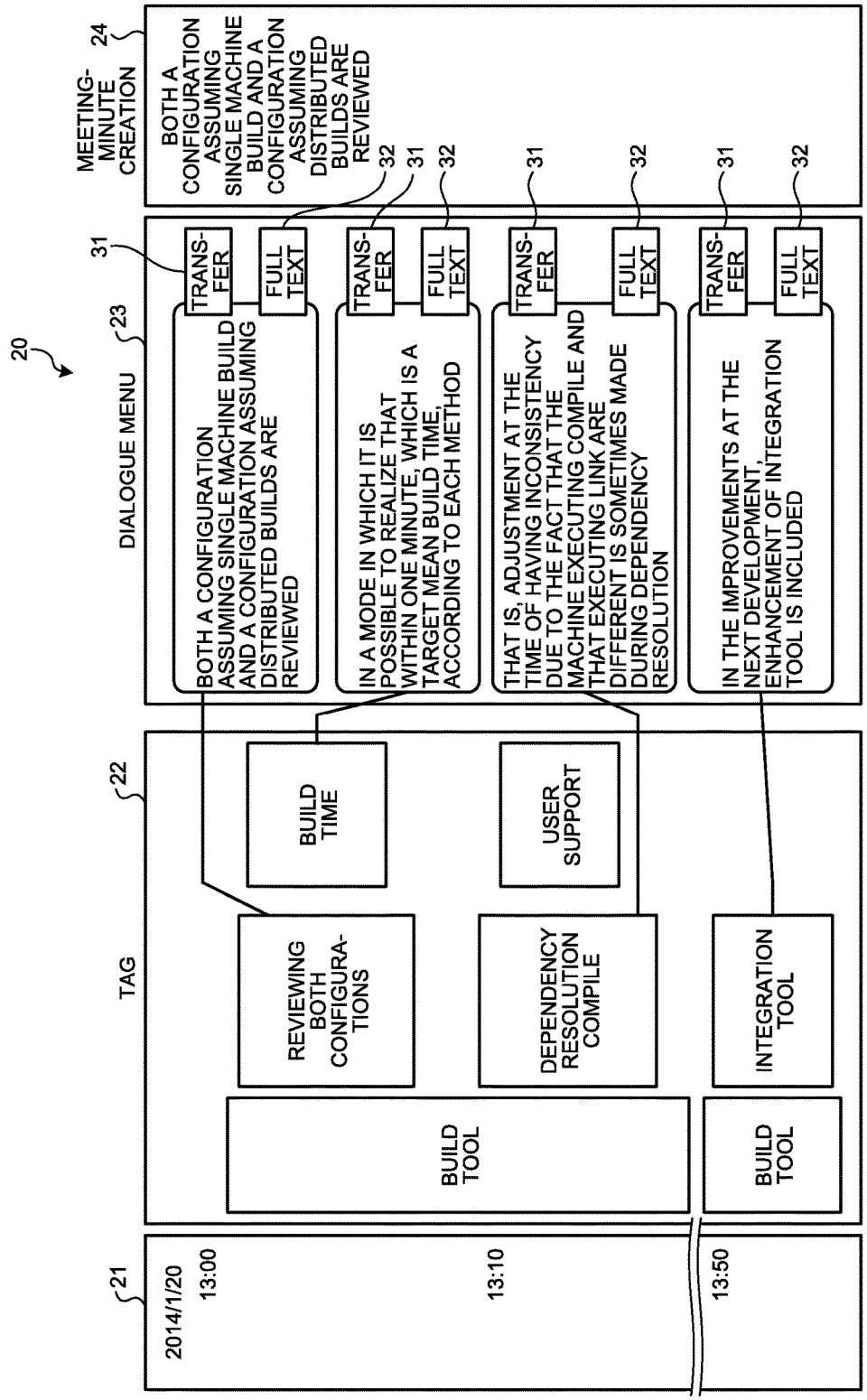
FIG. 12 is a diagram illustrating an example of the UI screen.

FIG. 12 is a diagram illustrating an example of the UI screen 20 updated according to a user operation, and illustrates a UI screen 20 updated according to selection of a "build tool" tag on the UI screen 20 in FIG. 11. In the tag area 22 on the UI screen 20 in FIG. 11, two "build tool" tags are displayed. Two "build tool" tags are displayed because a keyword of which keyword text is "build tool" has appeared repeatedly in different time periods within a set time range. When any one of the two "build tool" tags is selected by a user on the UI screen 20 in FIG. 11, in addition to the time period of the selected "build tool" tag, the time period of the other "build tool" tag having the same label as that of the selected "build tool" tag is set in a new time range. Subsequently, a time axis corresponding to theses time ranges is displayed in the time axis area 21. Further, among the tags generated by the tag generating unit 17 with respect to the time-series texts within these time ranges, tags that can be arranged in descending order of weight are displayed in the tag area 22. Furthermore, among the representative time-series texts of the tags arranged in the tag area 22, representative time-series texts that can be arranged in descending order of weight of tags are displayed.

As illustrated in FIG. 12, the "build tool" tag selected by a user and the other "build tool" tag having the same label as that of the selected "build tool" tag are displayed on the leftmost part in the tag area 22, and when the user selects one of these tags, the screen returns to the UI screen 20 illustrated in FIG. 11.

On the UI screen 20 in FIG. 12, a meeting-minute creating area 24 (fourth display area) for users to edit texts is added on the right side of the dialogue menu area 23. Addition and deletion of the meeting-minute creating area 24 with respect to the UI screen 20 can be switched by a predetermined button operation and the like on the UI screen 20 at an arbitrary timing. In the present embodiment, it is assumed that a voice recognition text of dialogues during a meeting is used as time-series data, and users can create meeting minutes using the meeting-minute creating area 24. A button for switching between addition and deletion of the meeting-minute creating area 24 is omitted from the drawings.

When the meeting-minute creating area 24 is added on the UI screen 20, as illustrated in FIG. 12, with respect to each of the representative time-series texts displayed in the dialogue menu area 23, a "transfer" button 31 and a "full text (key sentence)" button 32 are added on the UI screen 20. As for the "full text (key sentence)" button 32, the label notation thereof is switched between "full text" and "key sentence", according to the display mode of the dialogue menu area 23. The "full text" button 32 is illustrated in FIG. 12.

When the "transfer" button 31 is pressed by a user, a representative time-series text corresponding to the pressed "transfer" button 31 is transferred in the meeting-minute creating area 24. When the representative time-series text is transferred in the meeting-minute creating area 24 according to the operation of the "transfer" button 31, it is possible to configure that a voice (original data) corresponding to the representative time-series text to be transferred is reproduced. Further, when the representative time-series text is a text of a translated language that is created by machine-translating a text of an original language, it is possible to configure that the text of the original language (original data) is displayed in the meeting-minute creating area 24 or the like for a predetermined period of time. Furthermore, when the representative time-series text is a text created by performing character recognition on character images such as handwritten letters and printed letters, it is possible to configure that the character images (original data) is displayed in the meeting-minute creating area 24 or the like for a predetermined period of time.

When the "full text" button 32 is pressed by the user, the display mode of the dialogue menu area 23 is switched from a key sentence mode in which only a representative time-series text is displayed to a full text mode in which a representative time-series text and time-series texts therearound are displayed. Subsequently, all of the time-series texts around the representative time-series text corresponding to the pressed "full text" button 32 are displayed in the dialogue menu area 23. In the full text mode, by scrolling the dialogue menu area 23, the time-series texts around the representative time-series text can be viewed. Further, the "full text" button 32 added to each of the time-series texts is switched to the "key sentence" button 32 and when the "key sentence" button 32 is pressed, the display mode of the dialogue menu area 23 is switched from the full text mode to the key sentence mode, and the screen returns to the original screen on which only the representative time-series text is displayed in the dialogue menu area 23.

Operations of Server Device

Next, operations of the server device 10 according to the present embodiment are described with reference to the flowcharts in FIGS. 13 to 16. In the following descriptions, it is assumed that voices input in the server device 10 by the voice input device 50 are already accumulated in the voice-data accumulating unit 12, and operations of the server device 10 when the UI screen 20 is viewed on the display device 60 after a user has logged in the server device 10 are described.

Figure 13:
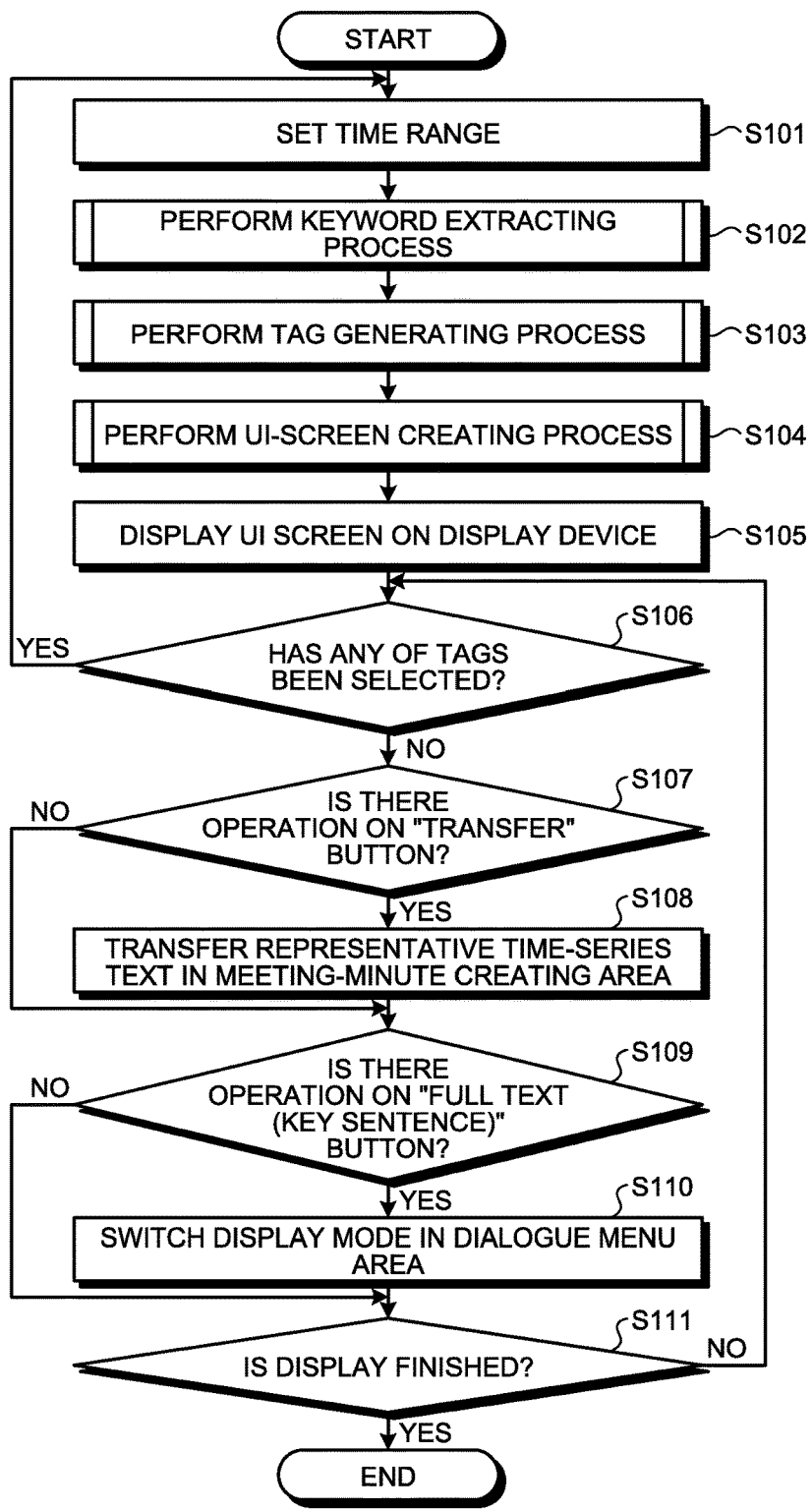
FIG. 13 is a flowchart illustrating an example of a process procedure performed by the server device.

FIG. 13 is a flowchart illustrating an example of a process procedure performed by the server device 10 according to the present embodiment. First, when a user logs in the server device 10 and performs a predetermined operation for specifying a time range, the UI control unit 19 sets the time range according to a user operation (Step S101).

Next, the keyword extracting unit 15 performs a keyword extracting process based on the time range set at Step S101 (Step S102).

Figure 14:
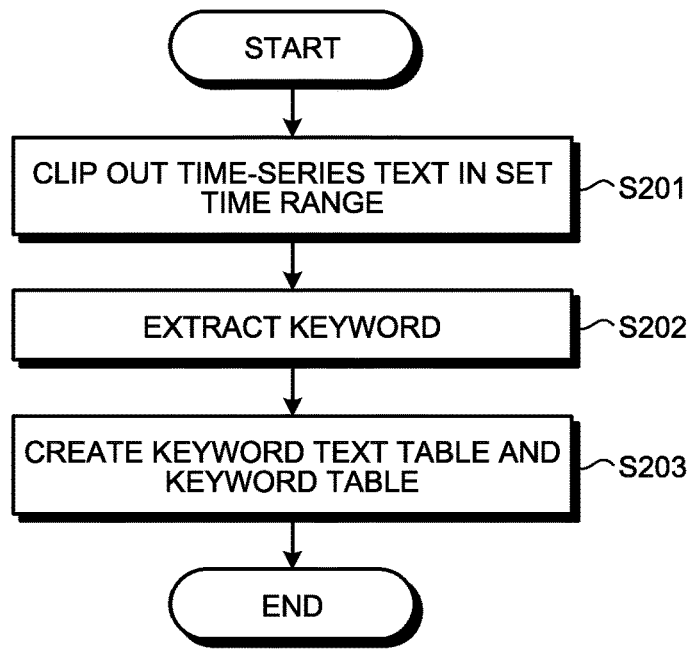
FIG. 14 is a flowchart illustrating an example of a keyword extracting process.

FIG. 14 is a flowchart illustrating an example of a keyword extracting process. When the keyword extracting process is started, the keyword extracting unit 15 first clips out time-series texts in a time range set at Step S101 from time-series texts accumulated in the time-series-text accumulating unit 14 (Step S201). Thereafter, the keyword extracting unit 15 extracts a keyword from the time-series texts clipped out at Step S201 (Step S202).

Subsequently, the keyword extracting unit 15 creates the keyword text table T4 and the keyword table T5 according to the result at Step S202 and stores these tables in the keyword holding unit 16 (Step S203), and finishes the keyword extracting process.

After finishing the keyword extracting process, based on the keyword text table T4 and the keyword table T5 held in the keyword holding unit 16, the tag generating unit 17 performs a tag generating process (Step S103).

Figure 15:
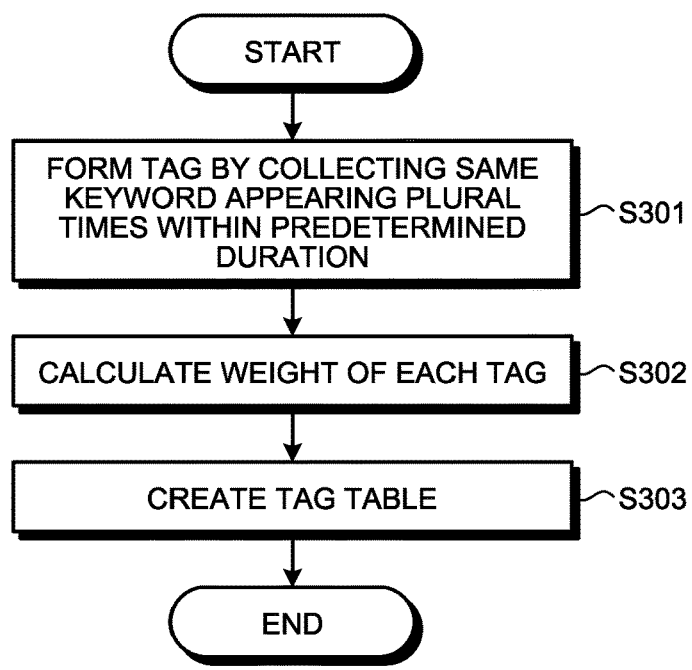
FIG. 15 is a flowchart illustrating an example of a tag generating process.

FIG. 15 is a flowchart illustrating an example of the tag generating process. When the tag generating process is started, the tag generating unit 17 first refers to the keyword text table T4 and the keyword table T5 held in the keyword holding unit 16, and then collects, among the keywords extracted at Step S102, the same keyword appearing a plurality of times within a predetermined duration that is set according to the time range set at Step S101 to form a tag (Step S301). The tag generated at Step S301 has a time period from the first appearing time of the collected keyword until the last appearing time thereof, and designates the keyword text of the keyword as a label.

Next, the tag generating unit 17 calculates the weight of each of the tags generated at Step S301 (Step S302). Thereafter, according to the results at Step S301 and Step S302, the tag generating unit 17 creates the tag table T6 and stores the created tag table T6 in the tag holding unit 18 (Step S303), and then finishes the tag generating process.

After finishing the tag generating process, the UI control unit 19 performs a UI-screen creating process (Step S104).

Figure 16:
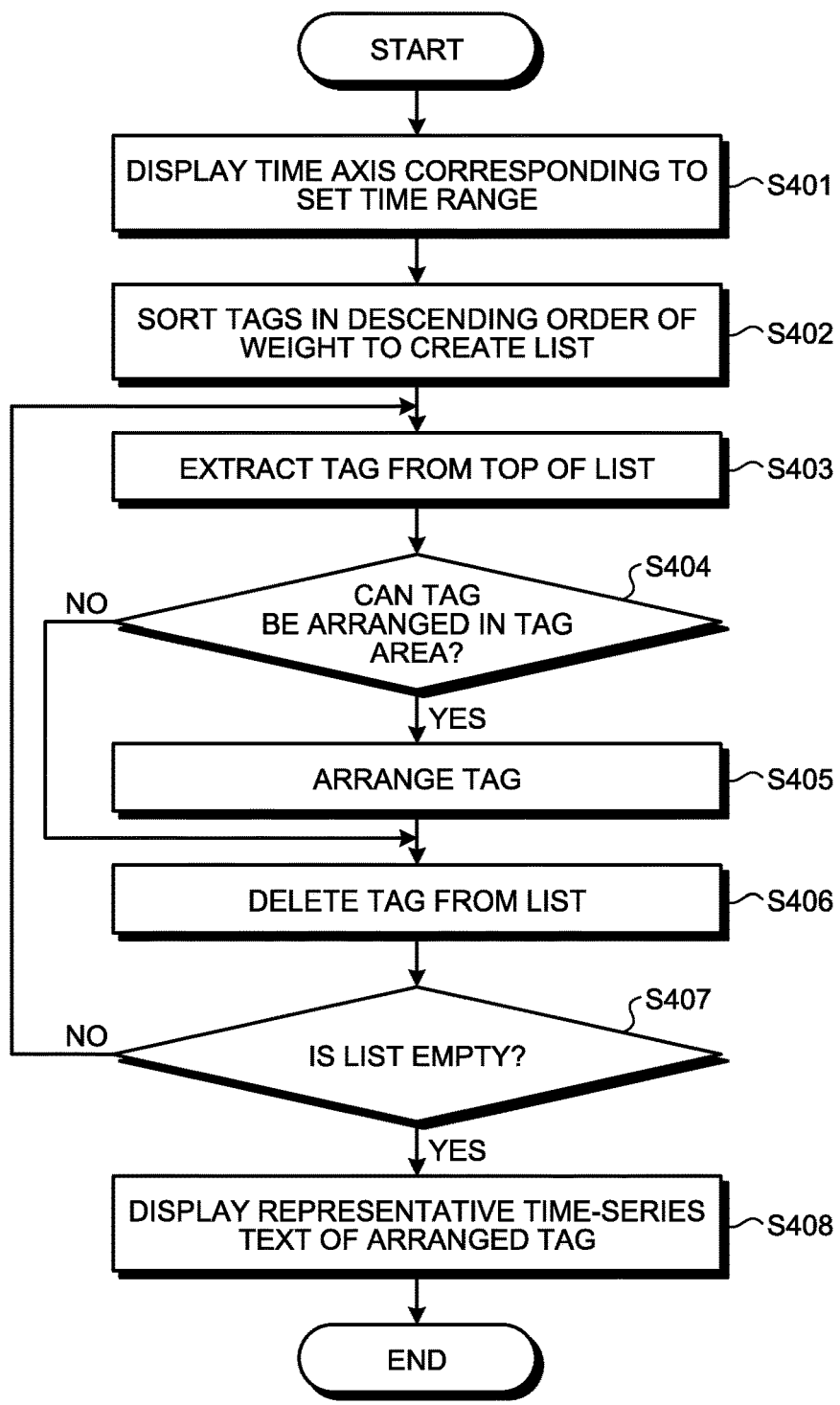
FIG. 16 is a flowchart illustrating an example of a UI-screen creating process.

FIG. 16 is a flowchart illustrating an example of the UI-screen creating process. When the UI-screen creating process is started, the UI control unit 19 first displays a time axis corresponding to the time range set at Step S101 in the time axis area 21 on the UI screen 20 (Step S401).

Next, the UI control unit 19 refers to the tag table T6 held in the tag holding unit 18, sorts the tags generated at Step S103 in descending order of weight, and creates a list of these tags (Step S402). Thereafter, the UI control unit 19 extracts a tag from the top of the list created at Step S402 (Step S403), and determines whether the tag can be arranged in a corresponding time period of the tag area 22 on the UI screen 20 (Step S404). In this process, when the tag extracted from the list at Step S403 can be arranged in the corresponding time period (YES at Step S404), the tag is arranged in the corresponding time period (Step S405), and the tag is deleted from the list (Step S406). Meanwhile, when the tag extracted from the list at Step S403 cannot be arranged in the corresponding time period (NO at Step S404), the tag is deleted from the list without performing any process (Step S406).

Thereafter, the UI control unit 19 determines whether the list created at Step S402 has become empty (Step S407), and when the list is not empty (NO at Step S407), the process returns to Step S403 to repeat the processes at and after Step S403. Meanwhile, when the list is empty (YES at Step S407), the UI control unit 19 displays, in the dialogue menu area 23, a representative time-series text of the tag to be displayed in the tag area 22 on the UI screen 20 (Step S408), and finishes the UI-screen creating process.

When the UI-screen creating process is finished, the UI control unit 19 displays the created UI screen 20 on the display device 60 of a client terminal (Step S105). Thereafter, the UI control unit 19 monitors whether any user operation for selecting any of the tags on the UI screen 20 is performed (Step S106). Subsequently, when any of the tags is selected (YES at Step S106), the process returns to Step S101, and the time period of the selected tag is set in a new time range. Thereafter, by repeating the processes at and after Step S102, the UI screen 20 is updated.

When any tag is not selected (NO at Step S106) and a predetermined operation for adding the meeting-minute creating area 24 on the UI screen 20 is performed, the UI control unit 19 monitors whether any user operation for pressing the "transfer" button 31 or the "full text (key sentence)" button 32 added on the representative time-series text in the dialogue menu area 23 is performed (Step S107, Step S109). When there has been an operation for pressing the "transfer" button 31 (YES at Step S107), the UI control unit 19 transfers a representative time-series text corresponding to the operated "transfer" button 31 in the meeting-minute creating area 24 (Step S108). Further, when there has been an operation for pressing the "full text (key sentence)" button 32 (YES at Step S109), the display mode of the dialogue menu area 23 is switched between the key sentence mode in which only a representative time-series text is displayed and the full text mode in which a representative time-series text and time-series texts therearound are simultaneously displayed (Step S110).

Thereafter, until an operation for finishing the display of the UI screen 20 is performed (NO at Step S111), monitoring of user operations on the UI screen 20 at and after Step S106 is continued, and when the operation for finishing the display of the UI screen 20 is performed (YES at Step S111), a series of operations performed by the server device 10 is finished.

Effects of Embodiment

As described above in detail with specific examples, the server device 10 according to the present embodiment extracts a keyword from time-series texts within a time range that is set according to a user operation, collects the same keyword within a predetermined duration to generate a tag having a certain time period, creates the UI screen 20 on which tags are arranged in a corresponding time period on a time axis representing the set time range, and causes the display device 60 to display the created UI screen 20. Thereafter, when a user operation for selecting a tag on the UI screen 20 is performed, the time period of the selected tag is reset in a new time range so as to update the UI screen 20. Therefore, according to the present embodiment, a tag indicating a topic of a time-series text can be displayed with an arbitrary scale specified by a user.

The server device 10 according to the present embodiment is configured to select tags that can be arranged in the tag area 22 on the UI screen 20 in descending order of weight so as to display the selected tags in the tag area 22, and thus tags having high importance can be displayed clearly on the UI screen 20.

The server device 10 according to the present embodiment is configured to display, in the dialogue menu area 23, representative time-series texts of tags displayed in the tag area 22 on the UI screen 20, and thus acknowledgement of the outline of topics can be supported appropriately. Further, at this time, when a time-series text including a plurality of text candidates is selected as a representative time-series text, by displaying, in the dialogue menu list 23, a text candidate including the keyword of the tag selected according to a user operation as a representative time-series text, a user can accurately recognize the relevance between the tag selected according to a user operation and a newly displayed tag.

The server device 10 according to the present embodiment is configured to create the UI screen 20 having a visual expression for clearly illustrating a corresponding relation between tags displayed in the tag area 22 and representative time-series texts displayed in the dialogue menu area 23 by, for example, connecting each of the tags and the corresponding representative time-series text, and to display the UI screen 20 on the display device 60, and thus a user can accurately acknowledge the corresponding relation between the tags and the representative time-series texts to be displayed.

The server device 10 according to the present embodiment is configured to be able to switch the display mode of the dialogue menu area 23 on the UI screen 20 between the key sentence mode in which only a representative time-series text is displayed and the full text mode in which a representative time-series text and time-series texts therearound are displayed, according to the operations on the "full text (key sentence)" button 32, and thus searching of necessary information can be supported appropriately.

The server device 10 according to the present embodiment is configured to add, on the UI screen 20, the meeting-minute creating area 24 for users to edit texts according to predetermined user operations, and thus text editing operations using accumulated time-series texts can be supported appropriately.

The server device 10 according to the present embodiment is configured to transfer the representative time-series text displayed in the dialogue menu area 23 on the UI screen 20 in the meeting-minute creating area 24 according to the operations on the "transfer" button 31 added to the representative time-series text, and thus text editing operations can be performed effectively. In addition, at this time, original data of the representative time-series text to be transferred in the meeting-minute creating area 24 is reproduced or displayed, and thus a user can surely recognize the contents of the representative time-series text.

Modification

In the embodiment described above, while it is assumed that the first time range is set according to a user operation using a smartphone or a PC, it is also possible that, for example, the time range can be set by using an agenda of a meeting specified by a user.

Figure 18A:
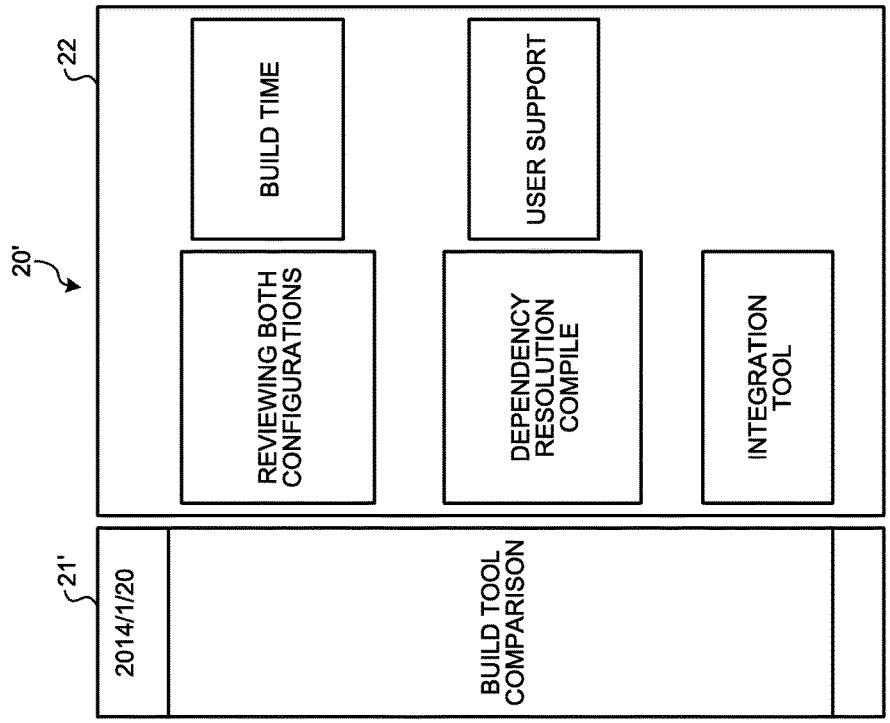
FIG. 18A is a diagram illustrating an example of a UI screen according to a modification.
Figure 18B:
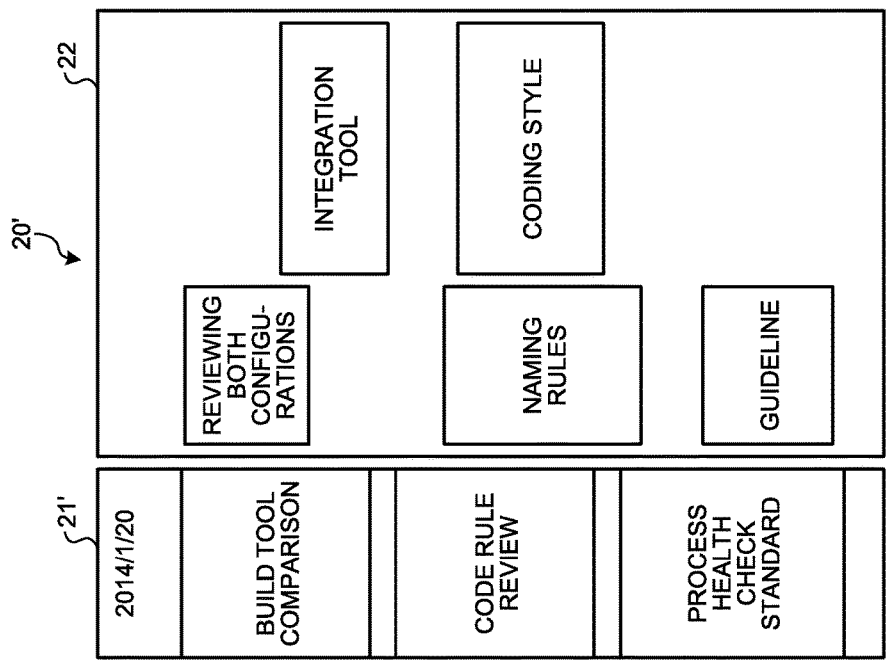
FIG. 18B is a diagram illustrating an example of a UI screen according to a modification.

FIG. 17 is a diagram illustrating a specific example of an agenda of a meeting specified by a user, and FIG. 18A and FIG. 18B are diagrams illustrating an example a UI screen 20' in a case where a recognition result text of dialogues in a meeting proceeded along with the agenda is designated as a time-series text. On the UI screen 20' illustrated in FIG. 18A, subjects in the agenda in FIG. 17 are illustrated in a time axis area 21'. When one of the subjects illustrated in the time axis area 21' is specified by a user, for example, as illustrated in FIG. 18B, the mode of the UI screen 20' is switched to a mode in which only parts relevant to the subject specified by the user are displayed. FIG. 18B illustrates the UI screen 20' displayed in a case where a subject of "build tool comparison" is specified by the user on the UI screen 20' in FIG. 18A.

In the present modification, first, when a user specifies a certain meeting, with respect to time-series texts of the meeting, generation and arrangement of tags are performed according to a method identical to that of the embodiment described above. Thereafter, when an agenda of the specified meeting is input in the server device 10 as a text file, the UI control unit 19 creates a subject list using the agenda. The subject list is, for example, created by recognizing, as a subject, the text of respective rows below a row itemized as the subject in the text file input in the server device 10. The subject list can be created from an agenda by using another text analysis technology, or can be input clearly by a user while the user uses a certain type of UI. Further, it is also possible to select a tag used as a subject from already generated tags.

Thereafter, the UI control unit 19 extracts the first subject from the subject list, and searches a tag that is most similar to the first subject. As for the tag similarity, for example, the subject and the tags are written with a space between words according to a morphological analysis, and the total number of letters that match between the respective texts of words written with a space therebetween is used. The tag of the largest number of matching letters is selected as the most similar tag. When the total number of matching letters with respect to all the tags is zero, it is determined that there is no similar tag.

In this example, when a plurality of tags having the same label are found, these tags are sorted in order of appearance in a certain time period. Thereafter, after a time-series text in the time period of a tag having appeared first, time-series texts in the time periods of tags following the first tag are inserted in order of appearance, and time-series texts in the time periods of the tags are collected, thereby rearranging the time-series texts corresponding to the tags, so that the order of these time-series texts becomes consecutive. This operation is repeated until the subject list becomes empty.

Thereafter, the tag generating unit 17 generates tags again with respect to the time-series texts for which the order thereof has been rearranged by the processes described above. At this time, the tag used as the tag most similar to the subject is not generated. Subsequently, similarly to the embodiment described above, the tags generated by the tag generating unit 17 are displayed in the tag area 22 on the UI screen 20'.

Further, other than an agenda in a meeting, for example, setting of the time range can be performed by using check items of check instructions specified by a user. In this case, the time-series texts are texts such as a recognition result text in which a checking result is input as a voice according to the check instructions. Furthermore, texts of notes written in chronological order or texts for which notes are character-recognized with an OCR and the like can be used as the time-series texts.

Figure 20:
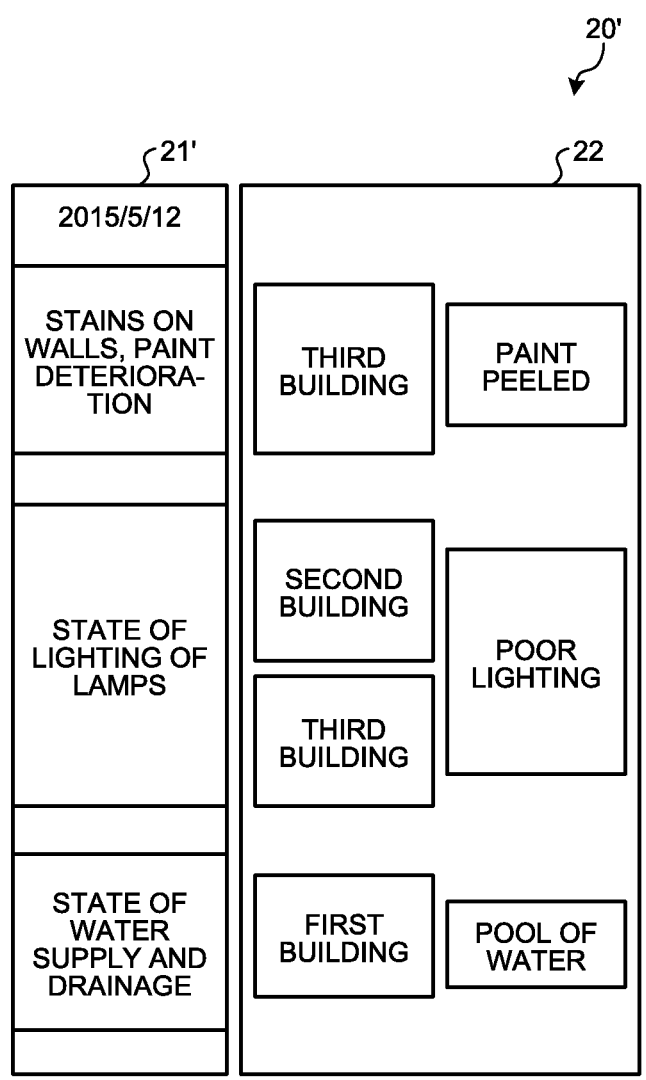
FIG. 20 is a diagram illustrating an example of the UI screen according to the modification.

FIG. 19 is a diagram illustrating a specific example of check instructions specified by a user, and FIG. 20 is a diagram illustrating an example of the UI screen 20' in a case where a recognition result text in which a checking result is input as a voice according to the check instructions is designated as a time-series text. On the UI screen 20' illustrated in FIG. 20, check items of the check instructions in FIG. 19 are displayed in the time axis area 21'. When one of the check items displayed in the time axis area 21' is specified by a user, the display mode of UI screen 20' is switched to a mode in which only parts relevant to the check items specified by the user are displayed. The operations of the server device 10 in this case are identical to those in the case of using an agenda in a meeting, and thus descriptions thereof are omitted.

Additional Explanations

The server device 10 according to the present embodiment can be realized by, for example, cooperation between hardware constituting a general computer and a program (software) executed on the computer. For example, as the computer executes a predetermined program, the voice recording unit 11, the voice recognizing unit 13, the keyword extracting unit 15, the tag generating unit 17, and the UI control unit 19 described above are realized. Further, by using a large-capacity storage device included in a computer, the voice-data accumulating unit 12, the time-series-text accumulating unit 14, the keyword holding unit 16, and the tag holding unit 18 can be realized. The keyword holding unit 16 and the tag holding unit 18 can be realized by using a storage device such as a RAM that temporarily holds data.

Figure 21:
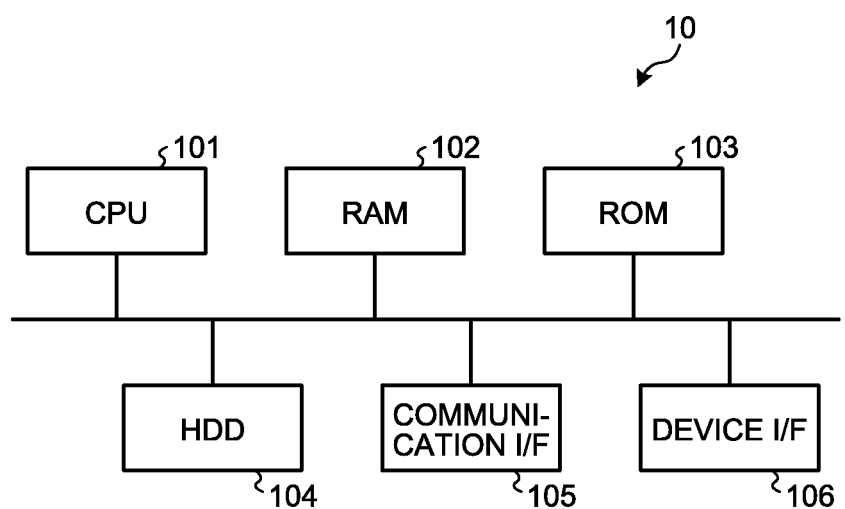
FIG. 21 is a block diagram illustrating a hardware configuration example of the server device.

FIG. 21 is a block diagram illustrating a hardware configuration example of the server device 10 according to the present embodiment. For example, as illustrated in FIG. 21, the server device 10 has a hardware configuration as a general computer including a hardware processor such as a CPU 101, storage devices such as a RAM 102 and a ROM 103, a large-capacity storage device such as an HDD 104, a communication I/F 105 that performs communication to outside via a network 40, and a device I/F 106 for connecting peripheral devices to the server device 10.

At this time, the program described above is provided while being recorded in a recording medium such as a magnetic disk, an optical disk, a semiconductor memory, or other devices similar to them. The recording medium that records therein the program can have any storage format as far as it is a computer-readable recording medium. Further, the program can be configured to be installed in a computer in advance, and the program distributed via a network can be configured to be installed in a computer as appropriate.

The program executed on the computer described above has a module configuration including respective functional units described above, such as the voice recording unit 11, the voice recognition device 13, the keyword extracting unit 15, the tag generating unit 17, and the UI control unit 19. In the module configuration, the respective units described above are generated on a main storage such as the RAM 102, as a processor reads out the program as appropriate to execute the program.

The server device 10 according to the present embodiment can be configured to realize a part or all of the respective functional parts described above with dedicated hardware such as an ASIC (Application Specific Integrated Circuit) or an FPGA (Field-Programmable Gate Array).

The server device 10 according to the present embodiment can be configured as a network system in which a plurality of computers are communicably connected to one another so as to be realized by distributing the respective constituent elements described above in the plurality of computers. Further, the server device 10 according to the present embodiment can be a virtual machine operated on a cloud system.

In the embodiment described above, there has been assumed an example in which the information processing device according to the present embodiment is realized as the server device 10 of a server-client system, voices are input from the voice input device 50 of a client terminal, and a UI screen is displayed on the display device 60 of the client terminal; however, the configuration of the information processing device is not limited thereto. The information processing device according to the present embodiment can be configured such that, not only the information processing device has the functions as the server device 10 described above, but also has the functions as the voice input device 50 and the functions as the display device 60. That is, the information processing device according to the present embodiment can be configured such that the server device 10 described above is integrated with at least one of the voice input device 50 and the display device 60.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
processing circuitry configured to function as:
a keyword extracting unit that extracts one or more keywords from time-series texts where a keyword has a time of appearance in the time-series texts within a first time range that is set according to a user operation;
a tag generating unit that generates one or more tags each corresponding to a keyword among the one or more keywords and having a time period from a first appearing time through a last appearing time of the keyword in the time-series texts within the first time range; and
a UI control unit that creates a UI screen including a first display area in which a first time axis representing the first time range is displayed and a second display area in which the one or more tags are displayed while causing each of the one or more tags to correspond to the time period on the first time axis, wherein
when one of the one or more tags displayed in the second display area is selected,
the keyword extracting unit extracts one or more new keywords from time-series texts within a second time range that is a time range equivalent to the time period of the selected tag,
the tag generating unit generates one or more new tags each corresponding to a new keyword among the one or more new keywords and having a time period from a first appearing time through last appearing time of the new keyword in the time-series texts within the second time range, and
UI control unit updates the UI screen so that a second time axis representing the second time range is displayed in the first display area and the one or more new tags are displayed in the second display area while causing each of the one or more new tags to correspond in time along the time period on the second time axis.

2. The information processing device according to claim 1, wherein
the tag generating unit calculates a weight with respect to each of the generated tags, and
the UI control unit selects the tags that can be arranged in the second display area in descending order of the weight, and displays the selected tags in the second display area.

3. The information processing device according to claim 1, wherein the UI control unit creates the UI screen further including a third display area in which a representative time-series text selected from time-series texts corresponding to the tags displayed in the second display area.

4. The information processing device according to claim 3, wherein when a time-series text including a plurality of text candidates is selected as the representative time-series text, the UI control unit displays a text candidate including a keyword of the selected tag as the representative time-series text.

5. The information processing device according to claim 3, wherein the UI control unit creates the UI screen having a visual expression for clearly illustrating a corresponding relation between the tags displayed in the second display area and the representative time-series text displayed in the third display area.

6. The information processing device according to claim 3, wherein the UI control unit switches, according to a user operation, a display mode of the third display area between a first mode in which only the representative time-series text is displayed and a second mode in which the representative time-series text and time-series texts therearound are displayed.

7. The information processing device according to claim 3, wherein the UI control unit creates, according to a user operation, the UI screen further including a fourth display area for a user to edit a text.

8. The information processing device according to claim 7, wherein the UI control unit transfers, according to a user operation, the representative time-series text displayed in the third display area in the fourth display area.

9. The information processing device according to claim 8, wherein
the representative time-series text is a time-series text obtained by a recognizing process or a machine-translation process with respect to input original data, and
when the representative time-series text displayed in the third display area is transferred in the fourth display area, the UI control unit reproduces or displays original data of the representative time-series text to be transferred.

10. An information processing method executed by an information processing device, the method comprising:
extracting one or more keywords from time-series texts where a keyword has a time of appearance in the time-series texts within a first time range that is set according to a user operation;
generating one or more tags each corresponding to a keyword among the one or more keywords and having a time period from a first appearing time through a last appearing time of the keyword appearing in the time-series texts within the first time range; and
creating a UI screen including a first display area in which a first time axis representing the first time range is displayed and a second display area in which the one or more tags are displayed while causing each of the one or more tags to correspond to the time period on the first time axis, wherein
when one of the one or more tags displayed in the second display area is selected,
the extracting extracts one or more new keywords from time-series texts within a second time range that is a time range equivalent to the time period of the selected tag,
the generating generates one or more new tags each corresponding to a new keyword among the one or more new keywords and having a length of a time period from a first appearing time through a last appearing time of the new keyword in the time-series texts within the second time range, and
the creating updates the UI screen say that a second time axis representing the second time range is displayed in the first display area and the one or more new tags are displayed in the second display area while causing each of the one or more new tags to correspond in time alone the time period on the second time axis.

11. A computer program product including a non-transitory computer-readable recording medium having a plurality of instructions that are executable in a computer, the plurality of instructions causing the computer to perform:
extracting one or more keywords from time-series texts where a keyword has a time of appearance in the time-series texts within a first time range that is set according to a user operation,
generating one or more tags each corresponding to a keyword among the one or more keywords and having a time period from a first appearing time through a last appearing time of the keyword in the time-series texts within the first time range, and
creating a UI screen including a first display area in which a first time axis representing the first time range is displayed and a second display area in which the one or more tags are displayed while causing each of the one or more tags to correspond to the time period on the first time axis, wherein
when one of the one or more tags displayed in the second display area is selected,
the extracting extracts one or more new keywords from the time-series texts within a second time range that is a time range equivalent to the time period of the selected tag,
the generating generates one or more new tags each corresponding to a new keyword among the one or more new keywords and having a length of a time period from a first appearing time through a last appearing time of the new keyword in the time-series texts within the second time range, and
the creating updates the UI screen so that a second time axis representing the second time range is displayed in the first display area and the one or more new tags are displayed in the second display area while causing each of the one or more new tags to correspond in time along the time period on the second time axis.

* * * * *